(12) United States Patent
Hanashi et al.

(10) Patent No.: US 7,502,146 B2
(45) Date of Patent: Mar. 10, 2009

(54) IMAGE READING APPARATUS INCLUDING READING UNIT HAVING CONDUCTIVE ABUTTING PORTION

(75) Inventors: Ryo Hanashi, Ibaraki (JP); Takashi Suganuma, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 903 days.

(21) Appl. No.: 10/351,509

(22) Filed: Jan. 27, 2003

(65) Prior Publication Data

US 2003/0142370 A1    Jul. 31, 2003

(30) Foreign Application Priority Data

Jan. 29, 2002    (JP)    ............................ 2002-019635
Jan. 31, 2002    (JP)    ............................ 2002-022804

(51) Int. Cl.
*H04N 1/04*    (2006.01)
(52) U.S. Cl. ................ 358/483; 358/482; 358/496; 358/497; 358/474
(58) Field of Classification Search ................ 358/483, 358/482, 496, 497, 474; 250/208.1; 382/312
See application file for complete search history.

(56) References Cited

U.S. PATENT DOCUMENTS

| | | | | |
|---|---|---|---|---|
| 6,008,485 | A | * | 12/1999 | Chiang .................... 250/208.1 |
| 6,137,106 | A | * | 10/2000 | Kao ........................... 250/239 |
| 6,349,155 | B1 | * | 2/2002 | Youda et al. ................. 382/312 |
| 6,424,435 | B1 | * | 7/2002 | Kao ........................... 358/497 |
| 6,496,285 | B1 | * | 12/2002 | Fujimoto et al. ............. 358/475 |
| 2001/0038467 | A1 | | 11/2001 | Hanashi ...................... 358/475 |

FOREIGN PATENT DOCUMENTS

| | | |
|---|---|---|
| JP | HEI 1-144678 | 6/1989 |
| JP | 7-193689 | 7/1995 |
| JP | 9-284476 | 10/1997 |
| JP | 2001-133906 | 5/2001 |

* cited by examiner

*Primary Examiner*—Houshang Safaipour
(74) *Attorney, Agent, or Firm*—Fitzpatrick, Cella, Harper & Scinto

(57) ABSTRACT

An image reading apparatus has a placing member where an original is placed, a reading unit for reading an image of the original in a way that moves relatively to the placing member, and a press member for pressing the reading unit against the placing member. The reading unit includes a conductive abutting portion coming into a contact with the placing member, and a grounding member for grounding the conductive abutting portion.

4 Claims, 4 Drawing Sheets

IMAGE READING APPARATUS INCLUDING READING UNIT HAVING CONDUCTIVE ABUTTING PORTION

BACKGROUND OF THE INVENTION

1. Field of the Invention

The present invention relates generally to an image reading apparatus for reading an image of the original, and more particularly to an image reading apparatus for reading in a way that brings a reading unit into a contact with a placing member on which the original is placed.

2. Description of the Related Art

Some of book-oriented image reading apparatuses utilized for, e.g., copying machines, image scanners etc. have hitherto used CCDs and contact image sensors as image sensors.

In the case of using the image sensor, an optical system can be simplified and decreased in weight, and hence the whole apparatus can be downsized.

This type of image sensor, however, has a such a problem that a focal depth is small, and the resolution declines due to a fluctuation of distance between a platen glass and the image sensor.

In this respect, Japanese Patent Application Laid-Open No. 07-193689 copes with the above problem by providing a high-slidability spacer on a surface of the image sensor that faces to the platen glass, moving by pressure the image sensor towards the platen glass and thus keeping constant a gap between the platen glass and the image sensor.

In the case of using the image sensor, there is taken a method of providing an abutting member for restraining a deviation with respect to the focal depth and moving the image sensor in a state where the abutting member is brought into a frictional contact with the platen glass.

According to this method, however, triboelectrification might occur due to a frictional slide between the abutting member and the platen glass.

Then, when electric charges generated are discharged, electrostatic noises enter the image sensor disposed within an image reading unit and an electric circuit, with the result that an image output might be disturbed.

FIG. 5 is a schematic view representing an image defect caused by discharging the electric charges described above. FIG. 5 shows the enlarged view showing herein an image outputted in the case of using an original containing an uniform black image in a front half thereof and a white image in a rear half thereof. As illustrated in FIG. 5, a white spot pattern irregularly appears in the black image area, while a black spot (fog) pattern likewise appears in the white image area.

Further, in the case of copying an image emphasizing a gradation reproducibility such as a photographic image etc by use of a copying machine and so on, a uniformity of density is important. In this case, however, the uniformity of an output image declines due to the discharge noises entering the reading signals.

Japanese Patent Application Laid-Open No. 09-284476 discloses, as a measure against the static electricity caused by the frictional slide between the abutting member and the platen glass, a construction including a static electricity preventing mechanism for preventing the static electricity from being generated in a portion at which a roller for keeping a gap constant abuts on the platen glass.

This construction, to be specific, aims at de-electrifying the abutting portion between the roller and the platen glass in a way that attaches a de-electrifying cloth to an outer peripheral portion of the image sensor or a harness and thus preventing an electrostatic adhesion of dusts to the abutting member.

With the construction described above, however, the platen glass can be de-electrified by making the de-electrifying member abutting thereon. The abutting member itself can not be, however, de-electrified. Further, the de-electrifying cloth is easy to fall and fold down because of being used for a long period of time, and the effect thereof does not continue. Moreover, a conveying resistance increases due to the de-electrifying cloth, and hence a drive load rises, with the result that the apparatus architecture becomes hard to downsize and the electric power consumption gets difficult to decrease.

Further, Japanese Patent Application Laid-Open No. 07-193689 does not particularly deal with an electric resistance value of the abutting member and a de-electrification preventing process, nor does it show any measure against the occurrence of the image noises due to the discharge of the static electricity described above.

Furthermore, U.S. Pat. No. 6,008,485 exemplifies a ball bearing composed of a metallic material as an abutting member but has a problem, wherein the ball bearing is hard to control the gap related to the abutting member, and requires an additive such as an oil for lubricating the drive of the bearing, which is unpreferable in terms of contamination.

SUMMARY OF THE INVENTION

It is a primary object of the present invention to provide an image reading apparatus capable of preventing triboelectrification between a reading unit and an original placing member.

It is another object of the present invention to provide an image reading apparatus capable of preventing an occurrence of a defect of image reading due to electrostatic noises.

To accomplish the above objects, according to one aspect of the invention, an image reading apparatus has a placing member where an original is placed, a reading unit for reading an image of the original in a way that moves relatively with the placing member, and a press member for pressing the reading unit against the placing member, wherein the reading unit includes a conductive abutting portion coming into a contact with the placing member, and a grounding member for grounding the conductive abutting portion.

Other objects of the invention will become apparent in the following discussion.

DESCRIPTION OF THE PREFERRED EMBODIMENTS

Figure 1:
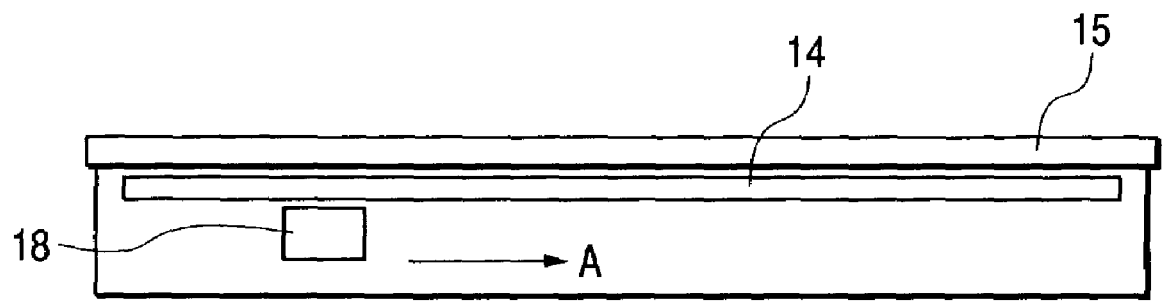
FIG. 1 is a schematic sectional view showing an image reading apparatus in a first embodiment.
Figure 2:
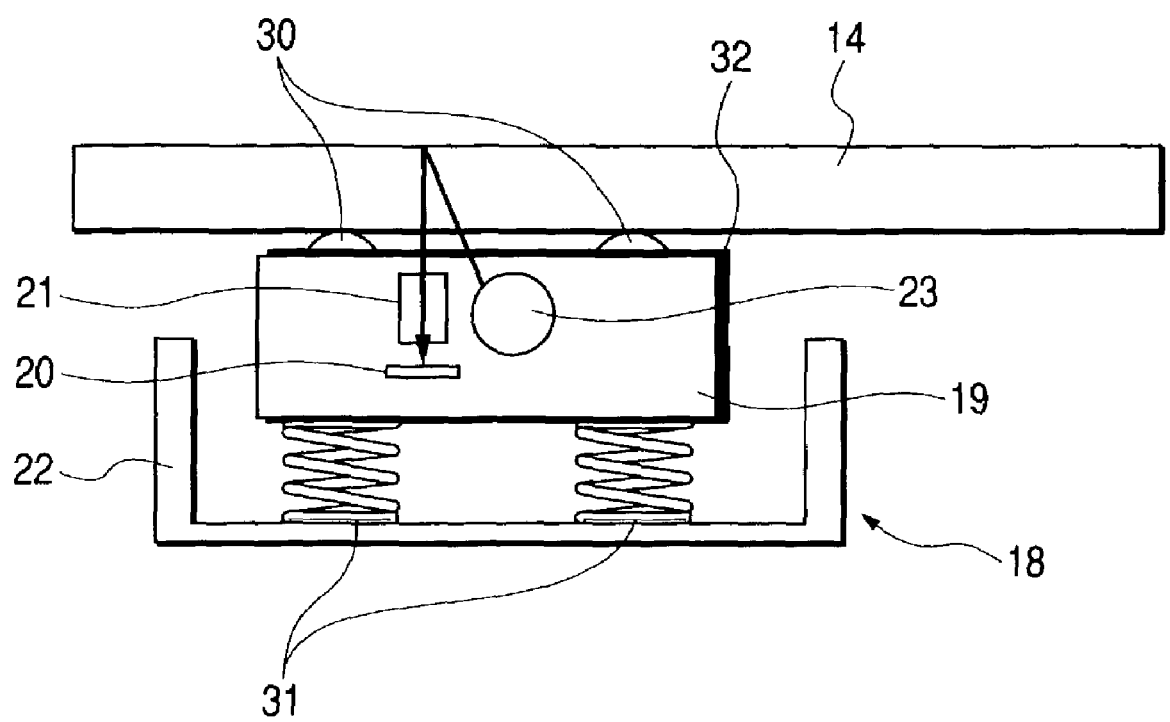
FIG. 2 is a view illustrating a configuration of an original reading unit of the image reading apparatus in the first embodiment.
Figure 3:
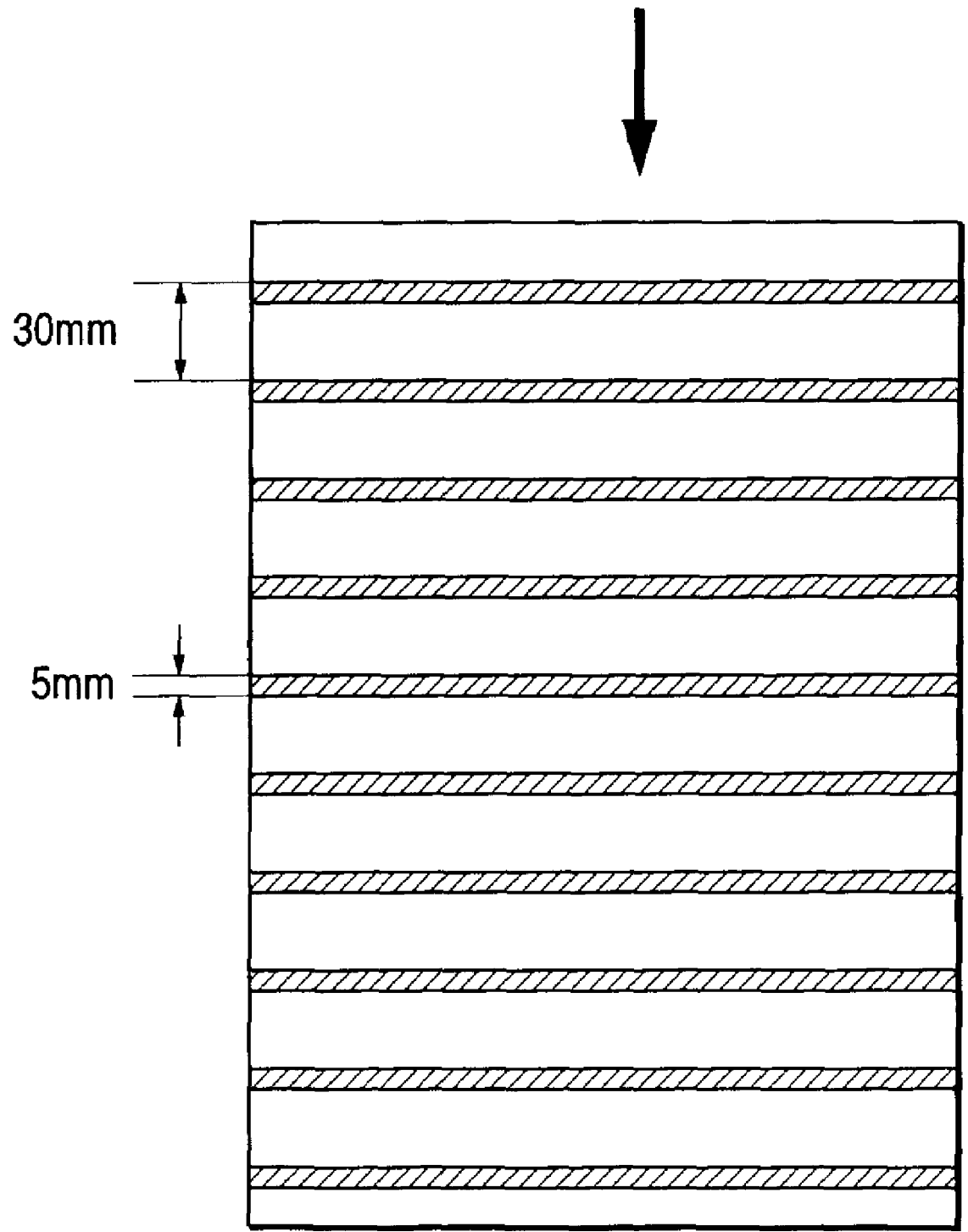
FIG. 3 is a diagram showing an example of a test for verifying an effect of the present invention.

FIGS. 1 through 3 show a first embodiment of the present invention.

FIG. 1 is a schematic sectional view showing an image reading apparatus in the first embodiment. Referring to FIG.

1, a platen glass 14 as a light shielding member is disposed, and a press plate 15 for pressing, against on the platen glass 14, an unillustrated original placed on the platen glass 14 is provided above the platen glass 14.

Further, an original reading unit 18 defined as an image reading unit is disposed under the platen glass 14. The original reading unit 18 reads an image of the original in such a way that an unillustrated driving device moves the original reading unit 18 in an auxiliary scan direction indicated by an arrowhead A with respect to the original placed on the platen glass 14.

On the other hand, FIG. 2 shows an enlarged view of a configuration of the original reading unit 18. The original reading unit 18 is constructed of, as shown in FIG. 2, a metal frame body 22 and an image sensor unit 19 disposed within the metal frame body 22 and movable in up-and-down directions.

Herein, the image sensor unit 19 includes a light source 23 for irradiating the original on the platen glass 14 with beams of light, a lens array 21 for converging reflected beams of light from the original, and a CCD (Charge Coupled Device) 20 serving as an image sensor as well as being a photoelectric converting device on which an image of the reflected beams of light converged by the lens array 21 is formed.

Note that this CCD 20 is the photoelectric converting device of which a pixel size is approximately 42 μm and on the order of 600 dpi in the first embodiment, wherein 5120 pixels are arranged linearly, thus configuring a line sensor.

Then, in the thus constructed image sensor unit 19, the beams of light emitted from the light source 23 are at first reflected from the original and converged by the lens array 21, and the image of the reflected beams of light is formed on the CCD 20.

Next, the reflected beams are converted into analog data by the CCD 20 and thereafter transmitted via an unillustrated flexible cable exhibiting a high flexibility to an illustrated circuit board disposed within the image reading apparatus.

Thereafter, a gain adjustment, an A/D conversion, a shading correction, a γ correction etc are performed in the circuit board, and subsequently the data are transmitted as image data via an unillustrated buffer RAM to a host computer.

On the other hand, as shown in FIG. 2, biasing springs 31 as conductive biasing members each exhibiting a conductivity are disposed between a bottom surface of the metal frame body 22 and the image sensor unit 19. Further, abutting members 30 as conductive abutting members protrude from an upper surface of the image sensor unit 19.

Then, the image sensor unit 19 is biased by the biasing springs 31, and the abutting members 30 come into contact with the platen glass 14, whereby the image sensor unit 19 and the platen glass 14 can be kept at a predetermined interval.

Herein, the abutting member 30 is composed of a conductive resin such as POM (polyoxymethylene) and so on.

Then, a grounding member of the abutting member 30 involves the use of a conductive clip 32 shown in FIG. 2 in the first embodiment. The metallic conductive clip 32 may be sufficient if composed of a low-resistance member, and aluminum is used in view of a processing characteristic in the first embodiment. This conductive clip 32 takes substantially a configuration that extends round downward from the surface provided with the abutting members 30 and embraces substantially in a C-shape the image sensor unit 19 continuous to the contact surface with the biasing springs 31.

Therefore, the components from the abutting members 30 down to the metal frame body 22 are in a conductive state through the conductive clip 32 and the biasing springs 31.

Namely, the abutting members 30 are grounded to the metal frame body 22 through the conductive clip 32 and the biasing springs 31.

Thus, the abutting member 30 is composed of the conductive member and grounded to the metal frame body 22, whereby when the original reading unit 18 moves, the abutting members 30 are brought into a frictional contact with the platen glass 14 and electric charges, even when generated by triboelectrification, escape.

Figure 5:
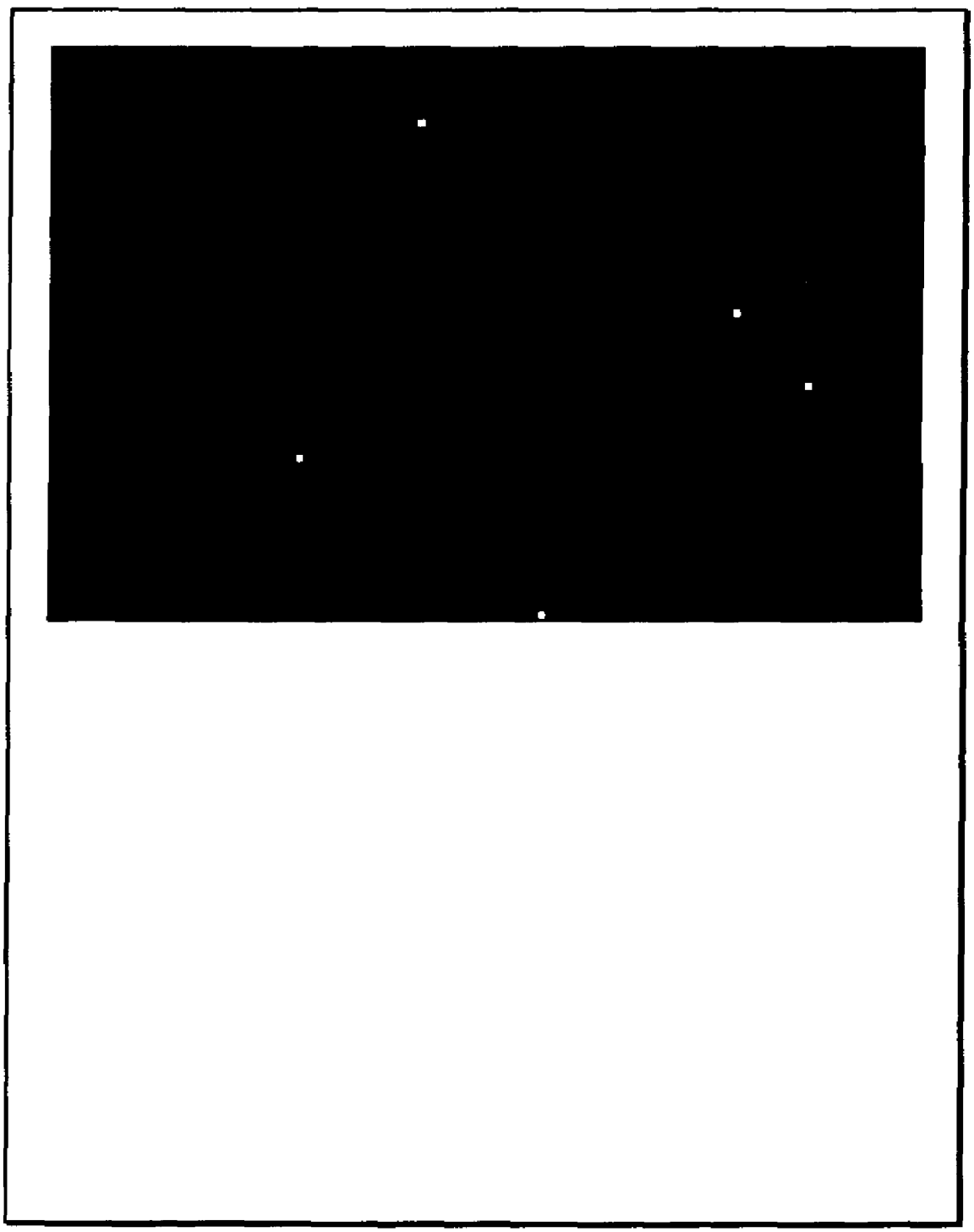
FIG. 5 is a diagram showing an example of a defect of an image.

By the way, as already described, if noises enter the image signals, a uniformity in a black area of the read image declines, and a fog occurs in a white area (see FIG. 5). In the case of evaluating the noise components of the read signals described above, however, a dispersion value of the noise with respect to the signal is used.

Herein, when the image signal value undergoes 8-bit processing, the uniformity in the black area declines if a dispersion value of a signal value 10(black area) becomes equal to or greater than 4. Further, if a dispersion value of a signal value 250(white area) becomes equal to or greater than 10, the fog gets conspicuous, and hence it is desirable in the image reading apparatus that the dispersion value be equal to or less than the above value.

Such being the case, the effects of the present invention will be explained by exemplifying comparative examples of the dispersion values in a case where the abutting member 30 is composed of an insulating material (insulation), a case where the same member 30 is formed of a conductive member (conduction), and a case where the conductive member according to the present invention is grounded (conduction plus earth).

An apparatus condition is that the original reading unit described above is operated at 2 levels, wherein a reading scan speed is set to 100 mm/sec and 200 mm/sec. Further, a test was performed in a testing room at a room temperature of 15° C. and a humidity of 10%, where the positive charges are easy to occur by the frictional contact.

An effect confirmation test will be explained referring to FIG. 3. Vertically-set A4 size originals (a main scan width is 210 mm, and an auxiliary scan length is 297 mm) exhibiting average reflection densities of 1.5, 0.07, are used as read target images. These densities are densities corresponding to the values 10 and 250 of the 8-bit luminance signals as described above through the CCD gain adjustment.

These originals are scanned in the arrow direction in FIG. 3 at a predetermined speed, and pieces of data corresponding to a width of 5 mm are analyzed for each 30 mm scan as indicated by hatching in FIG. 3, thereby obtaining respective dispersion values. With this analysis, 10-point data are gathered by one scan, and 50-point data are gathered by repeating the scan five times with each original density. The maximum value and the average value among the 50-point dispersion values are obtained, whereby performances are compared with each other.

The test was conducted under the condition described above, and Table 1 shows a result in a case where the process speed is 100 mm/sec.

TABLE 1

|  | Average | Worst |
| --- | --- | --- |
| Original Density D = 1.5 | | |
| Insulation | 3.7 | 7.0 |
| Conduction | 3.2 | 3.9 |
| Conduction + Earth | 3.0 | 3.5 |

TABLE 1-continued

|  | Average | Worst |
| --- | --- | --- |
| Original Density D = 0.07 | | |
| Insulation | 9.5 | 14.6 |
| Conduction | 7.0 | 9.2 |
| Conduction + Earth | 6.9 | 8.3 |

According to Table 1, even the (insulating) abutting member can acquire a sufficient performance if the average is taken. When observing the worst points, however, the target levels (which are equal to or less than 4 in the case of D=1.5 and equal to or less than 10 in the case of D=0.07) are not yet attained. The (conductive) abutting member and (conduction+earth) abutting member satisfied the target levels and acquired the sufficient performances.

In the case where the process speed is 200 mm/sec, however, a result becomes as shown in Table 2.

TABLE 2

|  | Average | Worst |
| --- | --- | --- |
| Original Density D = 1.5 | | |
| Insulation | 6.0 | 9.9 |
| Conduction | 4.3 | 6.6 |
| Conduction + Earth | 3.5 | 4.0 |
| Original Density D = 0.07 | | |
| Insulation | 16.0 | 20.6 |
| Conduction | 12.0 | 14.3 |
| Conduction + Earth | 7.2 | 8.8 |

According to Table 2, a result of D=1.5 and D=0.07 is shown in the case of the (conductive) abutting member, and neither of them did not attain the target levels, while only the (conduction+earth) abutting member according to the present invention could exhibit a sufficient effect.

Thus, the abutting members 30 are composed of the conductive members, the electrically-grounded conductive clip 32 is provided, and the abutting members 30 are grounded to the metal frame body 22 through the conductive clip 32 and the biasing springs 31. With this configuration, when the original reading unit 18 moves, the abutting members 30 are brought into the frictional contact with the platen glass 14, and the electric charges, even when generated by the triboelectrification, escape. It is therefore possible to restrain the electrostatic noised from being generated by the frictional slide when scanning the original and to actualize the high-speed and high-quality image reading without causing a scale-up and a structural intricacy of the apparatus and also an increase in costs thereof.

Figure 4:
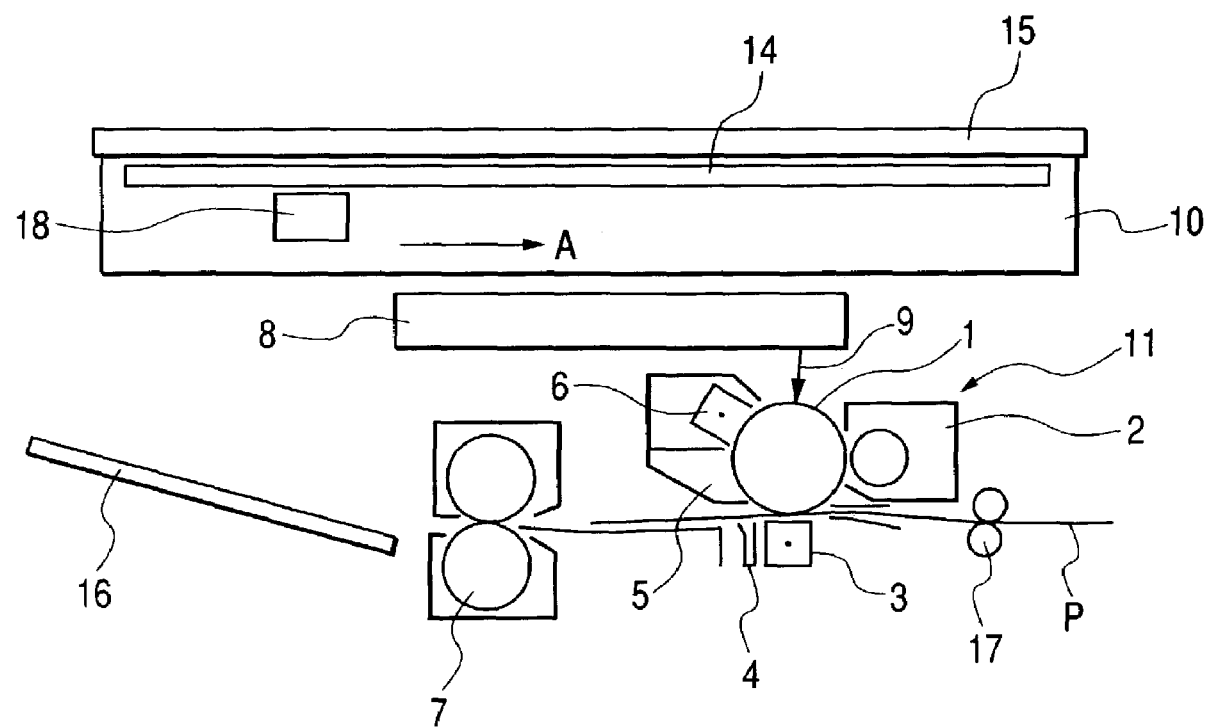
FIG. 4 is an explanatory view showing an outline of a configuration of a copying machine by way of one example of an image forming apparatus including the image reading apparatus in a second embodiment.

FIG. 4 shows a second embodiment. In the second embodiment, an image forming apparatus including the image reading apparatus constructed as described above, will be explained.

FIG. 4 is an explanatory view illustrating an outline of configuration of a copying machine by way of one example of the image forming apparatus.

Herein, this copying machine includes, as shown in FIG. 4, an image reading apparatus 10, and an image forming unit 11 for forming an image based on image data read by the image reading apparatus 10.

Note that this copying machine operates at a process speed of 200 mm/sec and is capable of copying 40 sheets of horizontally-set A4 size paper per minute. The image reading apparatus 10 is designed such that a reading speed is 200 mm/sec., a resolution is on the order of 600 dpi×600 dpi, and a maximum reading size is A3 size.

Then, in this type of copying machine, the signals outputted from the image reading apparatus 10 in the already-described process are transmitted to an image processor defined as an unillustrated image processing unit and thereafter converted into optimum image data in predetermined image processing. The thus converted image data are, after being cached in a memory, or directly sent to the image forming unit 11.

On the other hand, in the image forming unit 11, to start with, an exposure unit 8, based on the image data sent from the image processor, irradiates with laser beams 9 a surface of a photosensitive drum electrically charged beforehand by an electrifying unit 6, thereby forming an electrostatic latent image on the surface of the photosensitive drum 1.

Next, this electrostatic latent image is developed using toners by a developing unit 2, and a recording sheet P is conveyed to between the photosensitive drum 1 and a transferring unit 3 in accordance with rotations of the photosensitive drum 1. Then, a toner image on the photosensitive drum 1 is transferred onto the recording sheet P by use of the transferring unit 3. After being transferred, the electric charges on the recording sheet P are de-electrified by a de-electrifying unit 4.

Further, the surface of photosensitive drum 1 is cleaned by a cleaning unit in order to form an image next time.

Then, after being de-electrified, the recording sheet P is guided to a fixing unit 7, wherein the recording sheet P is heated and pressurized with the result that the toner image is fixed as a permanent image. Then, the recording sheet P is discharged onto a sheet discharging tray 16.

In the copying machine performing the operations described above, in the case of using a highly rich gradation sheet such as printing paper as an original, there occurred an area where the gradation is locally undistinguishable when utilizing the insulation type of abutting member as in the prior art. This was attributed to the noises entering the read signals when the electric charges generated by the contact movement between the platen glass and the abutting member are discharged.

By contrast, according to the image forming apparatus using the image reading apparatus of the present invention, the occurrence of the noises as seen in the prior art could be restrained, and an expression with the rich gradations from a low-density area up to a high-density area could be reproduced.

Thus, the image reading apparatus 10 including the original reading unit 18 having the abutting members 30 formed of the conductive members is applied to the image forming apparatus, thereby making it possible to restrain the occurrence of the electrostatic noises due to the contact movement when scanning the original without causing the scale-up and the structural intricacy of the apparatus and also the increase in the costs, and to obtain the preferable output image without disturbing the image reading signals from the CCD.

Moreover, with this effect, the image disturbance due to the noises become hard to occur even in the image reading process in a FAX and the copying machine in which it is difficult for the user to perform the image correction, whereby a futile expenditure for the FAX communications and the consumption of the transferring material and the toners can be restrained.

According to the present invention, the electric charges, even when generated by the triboelectrification, escape, and it is therefore possible to restrain the occurrence of the electrostatic noises due to the frictional slide when scanning the original and to actualize the high-speed and high-quality image reading process without causing the scale-up and the structural intricacy of the apparatus and also the increase in the costs thereof.

The embodiments of the present invention have been discussed so far, however, the present invention is not limited to these embodiments and can be modified in any forms within the technical concept.

What is claimed is:

1. An image reading apparatus comprising:
   (1) a placing member where an original is placed;
   (2) a reading unit which reads an image of the original and is movable relative to the placing member; and
   (3) a conductive spring, which presses the reading unit against the placing member,
   wherein the reading unit includes:
   (a) a conductive abutting portion which comes into contact with the placing member and can keep a predetermined interval between the reading unit and the placing member;
   (b) a grounding member, having conductive properties, which is connected to the conductive abutting portion so as to ground the conductive abutting portion; and
   (c) a light source for irradiating the original placed on the placing member with light and a main body portion having a sensor receiving light reflected from the original, wherein (i) the conductive abutting portion is provided on one side of the main body portion and the conductive spring is provided on the other side of the main body portion, (ii) the grounding member is provided along an outer circumference of the main body portion so as to connect the conductive abutting portion and the conductive spring, and (iii) the grounding member electrically connects the conductive abutting portion and the conductive spring.

2. An image reading apparatus according to claim 1, wherein the conductive abutting portion is composed of a conductive resin.

3. An image reading apparatus according to claim 1, further comprising a metal box portion for supporting the reading unit via the conductive spring.

4. An image reading apparatus according to claim 1, wherein the conductive abutting portion is brought into frictional contact with the placing member.

* * * * *